US009710480B2

(12) United States Patent
Wang et al.

(10) Patent No.: US 9,710,480 B2
(45) Date of Patent: Jul. 18, 2017

(54) METHOD AND APPARATUS FOR PERFORMING AN INCREMENTAL UPDATE OF A RECOMMENDATION MODEL

(75) Inventors: Hao Wang, Beijing (CN); Alvin Chin, Beijing (CN); Hao Wang, Beijing (CN); Hrishikesh Brahmakal, Espoo (FI); Ari Aarnio, Espoo (FI)

(73) Assignee: NOKIA CORPORATION, Espoo (FI)

( * ) Notice: Subject to any disclaimer, the term of this patent is extended or adjusted under 35 U.S.C. 154(b) by 281 days.

(21) Appl. No.: 14/382,434

(22) PCT Filed: Mar. 9, 2012

(86) PCT No.: PCT/CN2012/072142
§ 371 (c)(1),
(2), (4) Date: Apr. 6, 2015

(87) PCT Pub. No.: WO2013/131278
PCT Pub. Date: Sep. 12, 2013

(65) Prior Publication Data
US 2015/0220555 A1 Aug. 6, 2015

(51) Int. Cl.
G06F 17/30 (2006.01)
(52) U.S. Cl.
CPC .. G06F 17/30174 (2013.01); G06F 17/30598 (2013.01); G06F 17/30867 (2013.01)
(58) Field of Classification Search
USPC ........................................ 707/624, 751, 721
See application file for complete search history.

(56) References Cited

U.S. PATENT DOCUMENTS 7,904,448 B2 *  3/2011  Chung ................... G06Q 30/02
                                                 707/721
2007/0260624 A1 * 11/2007  Chung ................... G06Q 30/02
(Continued)

FOREIGN PATENT DOCUMENTS

CN      1967533 A       5/2007
CN    101311928        11/2008
(Continued)

OTHER PUBLICATIONS

International Search Report for International PCT Application No. PCT/CN2012/072142, dated Dec. 13, 2012, 2 pages.
(Continued)

*Primary Examiner* — Hung T Vy
(74) *Attorney, Agent, or Firm* — Ditthavong & Steiner, P.C.

(57) ABSTRACT

An approach is provided for determining one or more recommendations based on an incremental update of a recommendation model. An incremental platform causes, at least in part, a categorization of activity information into a plurality of subsets based, at least in part, on one or more user groups, one or more item groups, at least one update time for at least one recommendation model associated with the activity information, or a combination thereof. The incremental platform further processes and/or facilitates a processing of the activity information based, at least in part, on the categorization to determine whether to perform an incremental update of the at least one recommendation model. The incremental platform also determines one or more recommendations based, at least in part, on the at least one recommendation model, the incremental update, or a combination thereof.

20 Claims, 16 Drawing Sheets

(56) References Cited

U.S. PATENT DOCUMENTS

| | | |
|---|---|---|
| 2008/0306808 A1 | 12/2008 | Adjaki et al. |
| 2011/0153669 A1 | 6/2011 | Villa et al. |
| 2011/0161331 A1* | 6/2011 | Chung .................. G06Q 30/02 707/751 |
| 2011/0238478 A1 | 9/2011 | Gottfurcht et al. |

FOREIGN PATENT DOCUMENTS

| | | |
|---|---|---|
| CN | 101361345 A | 2/2009 |
| CN | 102135989 A | 7/2011 |
| WO | 2011/106925 A1 | 9/2011 |

OTHER PUBLICATIONS

Office Action for corresponding Chinese Patent Application No. 201280072582.3, dated Feb. 6, 2017, 11 Pages.

* cited by examiner

METHOD AND APPARATUS FOR PERFORMING AN INCREMENTAL UPDATE OF A RECOMMENDATION MODEL

CROSS REFERENCE TO RELATED APPLICATIONS

This application is a national phase application of PCT Application No. PCT/CN2012/072142, filed Mar. 9, 2012, the content of which is incorporated herein by reference in its entirety.

BACKGROUND

Service providers and device manufacturers (e.g., wireless, cellular, etc.) are continually challenged to deliver value and convenience to consumers by, for example, providing compelling network services. One such compelling network service is the service of providing recommendations to users regarding recommended content. Certain recommendation systems, such as collaborative recommendation models, may base recommendations for a user on other users or other items that are associated with the user based on various activities. The collection of information regarding the users, the items, and the activities allows for recommendation service providers to collect a large amount of information to process and subsequently use to generate the recommendations. However, there are scalability issues that result from such recommendation models based on the extensive computational problems required to handle all of the information, particularly the new information as additional activities associated with the users and items are collected. Other issues with recommendation models exist, such as providing recommendations that a user may more confidently rely on based on the source of the recommendation. Accordingly, service providers and device manufacturers face significant technical challenges in handling the scalability of recommendation models while maintaining accurate recommendations that a user may confidently rely on.

SOME EXAMPLE EMBODIMENTS

Therefore, there is a need for an approach for determining one or more recommendations based on an incremental update of a recommendation model.

According to one embodiment, a method comprises causing, at least in part, a categorization of activity information into a plurality of subsets based, at least in part, on one or more user groups, one or more item groups, an update time for at least one recommendation model associated with the activity information, or a combination thereof. The method also comprises processing of the activity information based, at least in part, on the categorization to determine whether to perform an incremental update of the at least one recommendation model. The method further comprises determining one or more recommendations based, at least in part, on the at least one recommendation model, the incremental update, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to categorize activity information into a plurality of subsets based, at least in part, on one or more user groups, one or more item groups, an update time for at least one recommendation model associated with the activity information, or a combination thereof. The apparatus is also caused to process of the activity information based, at least in part, on the categorization to determine whether to perform an incremental update of the at least one recommendation model. The apparatus is further caused to determine one or more recommendations based, at least in part, on the at least one recommendation model, the incremental update, or a combination thereof.

According to another embodiment, a computer-readable storage medium carries one or more sequences of one or more instructions which, when executed by one or more processors, cause, at least in part, an apparatus to categorize activity information into a plurality of subsets based, at least in part, on one or more user groups, one or more item groups, an update time for at least one recommendation model associated with the activity information, or a combination thereof. The apparatus is also caused to process of the activity information based, at least in part, on the categorization to determine whether to perform an incremental update of the at least one recommendation model. The apparatus is further caused to determine one or more recommendations based, at least in part, on the at least one recommendation model, the incremental update, or a combination thereof.

According to another embodiment, an apparatus comprises means for causing, at least in part, a categorization of activity information into a plurality of subsets based, at least in part, on one or more user groups, one or more item groups, an update time for at least one recommendation model associated with the activity information, or a combination thereof. The apparatus also comprises means for processing of the activity information based, at least in part, on the categorization to determine whether to perform an incremental update of the at least one recommendation model. The apparatus further comprises means for determining one or more recommendations based, at least in part, on the at least one recommendation model, the incremental update, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining one or more recommendations based on an incremental update of a recommendation model are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to activity associated with one or more users that is used to generate one or more recommendations, it is contemplated that the approach described herein may be based on activity associated with one or more items or a combination of one or more items and one or more users.

Figure 1:
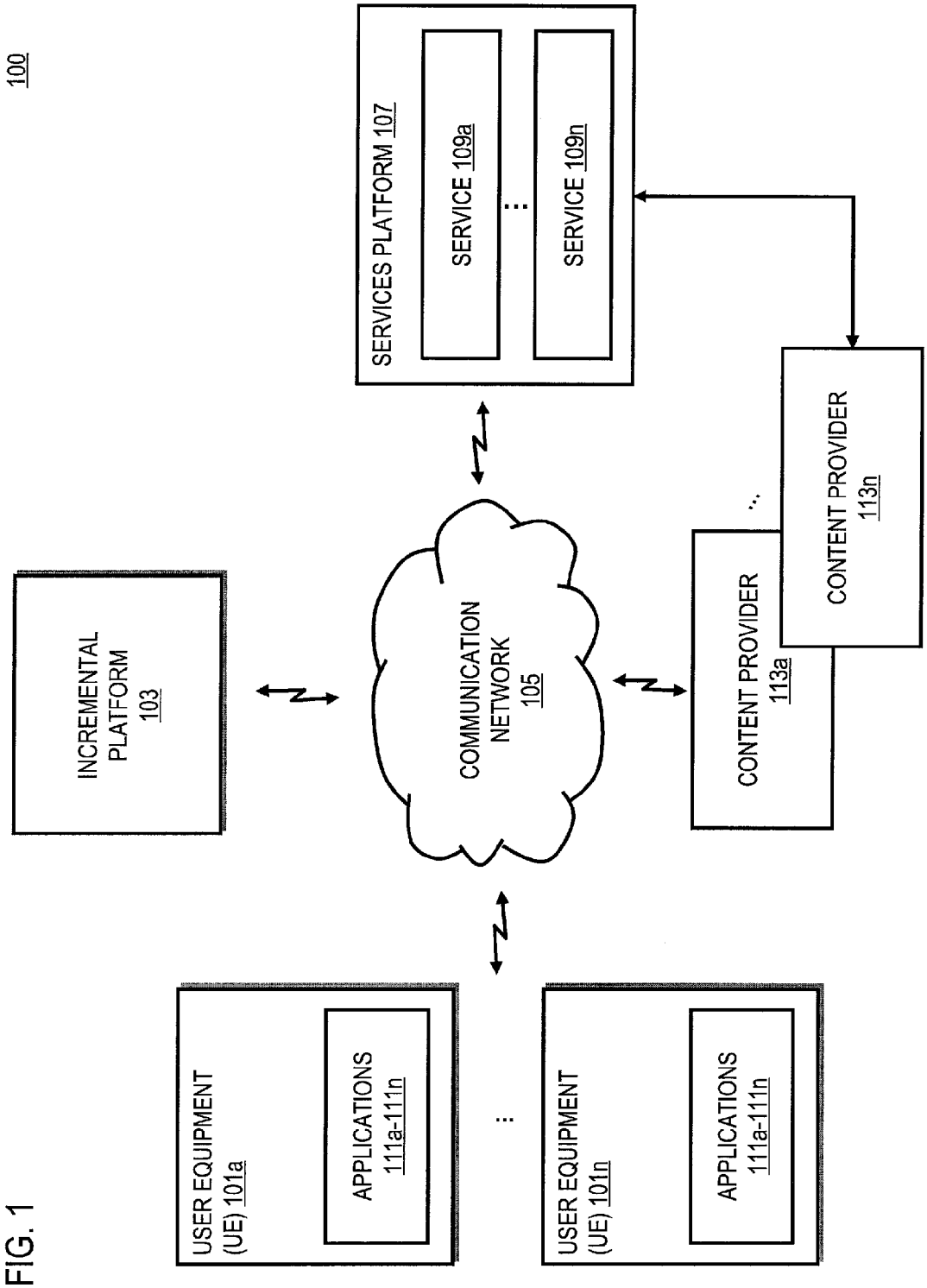
FIG. 1 is a diagram of a system capable of determining one or more recommendations based on an incremental update of a recommendation model, according to one embodiment.

FIG. 1 is a diagram of a system capable of determining one or more recommendations based on an incremental update of a recommendation model, according to one embodiment. As discussed above, the information age has generated a tremendous amount of information that users may access electronically. The tremendous amount of information may leave users feeling overloaded or may prevent users from finding information that they may find useful or relevant. To alleviate the information overload, service providers have created recommendation models to recommend content to the users. Such recommendation models may collect information regarding the users, various items, and associated activities between users, items and/or users and items. The recommendation models may then use the collected information to generate one or more recommendations. By way of example, user-based collaborative filtering recommendation models may determine user-user similarity to find a user's given neighbors who have historically had similar tastes on items and/or content. Thus, the items that the given user's neighbors have associated activity with may be recommended to the user. Similarly, in item-based collaborative filtering, item-item similarity may be determined to find an item's given neighbors that have historically attracted similar users. Thus, the neighbors of the items that a user has liked are recommended to the user. Accordingly, for recommendation models, such as collaborative filtering recommendation models, an important part of the model is determining the similarity values between users, items, and users/items.

However, as the amount of collected information increases, there become issues with the scalability of such recommendation models. The amount of information that is needed to maintain accuracy leads to issues with efficiency. As the number of users and items increases, particularly with collaborative filtering recommendation models, the computational requirements fail to scale up without requiring prohibitively large computational resources. Indeed, the computational requirements of such recommendation models grow polynomially with the number of users and items within the recommendation system. As a result, the computational power necessary to compute the similarity values between users, items and users/items to generate the one or more recommendations normally may only be performed according to a fixed update schedule that tends to ignore recent activity associated with the users and the items; and therefore, ignores information that would lead to more accurate recommendations.

Further, many of the recommendations provided to a user are based on the general information that is collected by the recommendation system. Thus, for example, much of the information used to generate recommendations for a user is based on other users that are in no way connected to the user (e.g., there is no social connection, familial connection, etc.). Even further, general advertisements that are presented to a user electronically and that are unrelated to one or more recommendations currently have no way of indicating whether other users connected with the user have acted on the advertisement, such as buying the advertised product or recommending the advertised product. Thus, for recommended content, the only trust a user has in the content is for the user to trust the recommendation system or model used to recommend the content. For advertisements that are provided to the user generally, such as without being recommended by a recommendation model, there is no way for the user to directly or indirectly trust the content of the advertisement. Thus, the user is left having to decide whether to follow the advertisement without any basis.

To address these problems, a system 100 of FIG. 1 introduces the capability to determine one or more recommendations based on an incremental update of a recommendation model. The system 100 divides users into at least two groups and activities associated with the users into at least two groups. The division of the users and the activities is based on at least one update time for at least one recommendation model associated with the activity. The system 100 then processes activity information based on the user groups to determine whether to perform an incremental update of the at least one recommendation model. Thereafter, the system 100 determines one or more recommendations based on the at least one recommendation model, an incremental update of the at least one recommendation model, or a combination thereof. By generating one or more recommendations based on an incremental update, rather than purely on the recommendation model in a non-incremental basis, the system 100 is able to generate the recommendations with less computational resources. The system 100 is also able to determine new activity associated with a user that is provided the recommendations as well as other users that are paired with the user. By using the new activity associated with the other users within the user pairs, the system 100 is able to generate more accurate recommendations by using all of the available information, without requiring prohibitively large computational resources.

The at least one update time may be determined based on the last update that occurred associated with the recommendation model for each user. The system 100 then remembers the time the last update was executed as $T_o$ and denotes the current time when the at least one recommendation model will be updated as $T_n$. Accordingly, when the at least one recommendation model is updated based on new activities that have occurred between $T_o$ and $T_n$, the system 100 determines at least one group of users as $U(T_o, T_n)$ who became associated with the recommendation model during the time period $(T_o, T_n)$, and another user group as $U(0, T_o)$ who became associated with the recommendation model any time before $T_o$ up until the beginning of the recommendation model with respect to all users (e.g., indicated as 0). In one embodiment, there may be more than one update time that has occurred in the past. In which case, the groups of users may be further categorized into the groups based on when the users became associated with the recommendation model compared to the various update times.

The activity associated with the users may be any type of activity, including, but not limited to, commenting on electronically available items, indicating electronically available items are a favorite (e.g., on a product website, social networking website, etc.), sharing an item, forwarding an item, downloading an item, purchasing an item, etc. The items may be any type of electronically content, such as a website, a blog, a post on a social networking service, a good and/or service, etc. The items may also represent non-electronically available content but that is otherwise represented electronically, such as consumer goods and/or services available for sale on the Internet.

Similarly, the activities associated with the users are divided into two activity sets. One activity set $UA_n$ is the activity that occurred during the period $(T_o, T_n)$. Another activity set $UA_o$ is the activity that occurred during the period $(0, T_o)$. In one embodiment where there is more than one update time that has occurred in the past, the groups of activities may be further categorized into the groups based on when the activities occurred with respect to the update times. According to the above categorization, the total activity associated with a user may be indicated as $UA_a$, such that $UA_a = UA_n + UA_o$. The system 100 then uses the above categorization of the users and the activities to perform an incremental update of the at least one recommendation model, as discussed in detail below.

The system 100 may then compare the similarity of activity information between pairs of users among any of the users registered with the system 100 (including all of the users) to determine similarity information between the users, which may then be used to generate the one or more recommendations. In one embodiment, the recommendation model may be based on a collaborative filtering process according to Jaccard similarity denoted as $|A \cap B|/|A \cup B| = |A \cap B|/(|A| + |B| - |A \cap B|)$, where A represents the activity information associated with user a and B represents the activity information associated with user b. The similarity expression above may be abbreviated as $z/(x+y-z)$, where $x=|A|$, $y=|B|$, and $z=|A \cap B|$. The system 100 may store the values for x, y and z in a database and/or a file for each user pair (a,b) and use this information incrementally for future determinations of similarity values for the at least one recommendation model. Although the above method discusses determining the recommendation model based on the Jaccard similarity, one of ordinary skill in the art would recognize that the methods disclosed herein may be applied to other similarity measures, such as the Pearsons Coefficient and Cosine similarity. Accordingly, based on the above categorization of the users and items (e.g., into two groups each), there may be four cases for determining the similarities between the users. However, one of ordinary skill in the art would appreciate that there may be more than four cases where the system 100 remembers more than one update time, and therefore may divide the users and activities into more than four groups.

Under Case 1, a user pair may be associated with new user a and new user b, where new user means the user is newly associated with the at least one recommendation model since at least one update time $T_o$. Under this scenario, there is no incremental update because there is no information previously collected before the update time for both of the users. Accordingly, for determining the similarity scores for the recommendation model, if either one of the user a or b is not associated with any activity $UA_a$, (e.g., $|UA_o(a)|+|UA_n(a)|=0$ or $|UA_o(b)|+|UA_n(b)|=0$), then there is no information to process to generate similarity scores. However, if both of the users have activity that has occurred since the last update time $T_o$ (e.g., $|UA_n(a)|>0$ and $|UA_n(b)|>0$), then the similarity(a,b) is:

$$= |UA_n(a) \cap UA_n(b)|/|UA_n(a) \cup UA_n(b)|$$

$$= |UA_n(a) \cap UA_n(b)|/(|UA_n(a)|+|UA_n(b)|-|UA_n(a) \cap UA_n(b)|)$$

$$= z/(x+y-z)$$

such that the system stores the similarity related measurement for user pair (a,b) according to:

$x=|UA_n(a)|$ $Y=UA_n(b)|$ $z=|UA_n(a) \cap UA_n(b)|$ and the similarity information used to generate the one or more recommendations is $=z/(x+y-z)$.

Under Case 2, a user pair may be associated with new user a and old user b, where old user means the user was previously registered with the at least one recommendation model before the at least one update time $T_o$. Under this scenario, there is no incremental update because there is no information previously collected before the update time for at least one of the users. Accordingly, for determining the similarity scores for the recommendation model, if either one of the user a or b is not associated with any activity $UA_a$, (e.g., $|UA_a(a)|=0$ or $|UA_a(b)|=0$), then there is no information to process to generate similarity scores. Thus, similarity (a,b)=0. However, if both of the users have activity (e.g., for user a, activity that has occurred since the last update time $T_o$, and for user b, activity that has occurred since the beginning 0, such that $|UA_n(a)|>0$ and $|UA_a(b)|>0$), then the similarity(a,b) is:

$$= |UA_n(a) \cap UA_a(b)|/|UA_n(a) \cup UA_a(b)|$$

$$= |UA_n(a) \cap UA_a(b)|/(|UA_n(a)|+|UA_a(b)|-|UA_n(a) \cap UA_a(b)|)$$

$$= z/(x+y-z)$$

such that the system stores the similarity related measurement for user pair (a,b) according to:

$x==|UA_n(a)|$ $Y=|UA_a(b)|$ $z=|UA_n(a) \cap UA_a(b)|$ and the similarity information used to generate the one or more recommendations is $=z/(x+y-z)$.

Under Case 3, a user pair may be associated with old user a and new user b. Similar to Case 2, under this scenario, there is no incremental update because there is no information previously collected before the update time for at least one of the users. Accordingly, for determining the similarity scores for the recommendation model, if either one of user a or user b is not associated with any activity $UA_a$, (e.g., $|UA_a(a)|=0$ or $|UA_a(b)|=0$), then there is no information to process to generate similarity scores. Thus, similarity(a,b)=0. However, if both of the users have activity (e.g., for user b, activity that has occurred since the last update time $T_o$, and for user a, activity that has occurred since the beginning 0, such that $|UA_a(a)|>0$ and $|UA_n(b)|>0$), then the similarity(a,b) is:

$$= |UA_a(a) \cap UA_n(b)|/|UA_a(a) \cup UA_n(b)|$$

$$= |UA_a(a) \cap UA_n(b)|/(|UA_a(a)|+|UA_n(b)|-|UA_a(a) \cap UA_n(b)|)$$

$$= z/(x+y-z)$$

such that the system stores the similarity related measurement for user pair (a,b) according to:

$x=|UA_a(a)|$ $y=|UA_n(b)|$ $z=|UA_a(a) \cap UA_n(b)|$ and the similarity information used to generate the one or more recommendations is $=z/(x+y-z)$.

In Case 4, a user pair may be associated with old user a and old user b. For this case, because both users are old users, the users will already be associated with a recommendation model that can be updated incrementally based on the old similarity scores. For instance, the old similarity scores, calculated under any one of the above three cases is:

$$= |UA_o(a) \cap UA_o(b)|/(|UA_o(a)|+|UA_o(b)|-|UA_o(a) \cap UA_o(b)|)$$

$$= z/(x+y-z)$$

where $x = |UA_o(a)|$, $y = |UA_o(b)|$, and $z = |UA_o(a) \cap UA_o(b)|$.

The new similarity score (designated $z'/(x'+y'-z')$) would be calculated according to:

$$= |UA_a(a) \cap UA_a(b)|/(|UA_a(a)|+|UA_a(b)|-|UA_a(a) \cap UA_a(b)|)$$

$$= \left|(UA_o(a)+UA_n(a)) \cap \left(UA_o(b)+\bigcap UA_n(b)\right)\right| /$$
$$\left(|UA_o(a)|+|UA_n(a)|+|UA_o(b)|+|UA_n(b)|-\left|(UA_o(a)+UA_n(a)) \cap \left(UA_o(b)+\bigcap UA_n(b)\right)\right|\right)$$

where the numerator z' is:

$=|UA_o(a) \cap (UA_o(b)|+|UA_o(a) \cap UA_n(b)|+|UA_n(a) \cap (UA_o(b)|+|UA_n(a) \cap (UA_n(b)|$ which, based on z above, simplifies to:

$z'=z+|UA_o(a) \cap UA_n(b)|+|UA_n(a) \cap (UA_o(b)|+|UA_n(a) \cap (UA_n(b)|$ and the denominator is:

$=x'+y'-z'$ which, based on x, y and z above, simplifies to:

$=(x+|UA_n(a)|)+(y+|UA_n(b)|)-(z+|UA_o(a) \cap UA_n(b)|+|UA_n(a) \cap (UA_o(b)|+UA_n(a) \cap (UA_n(b)|)$ such that $x'=x+|UA_n(a)|$ and $y'=y+|UA_n(b)|$. Accordingly, the new similarity is $z'/(x'+y'-z')$ and can be determined based on incremental changes to the old similarity.

Specifically, under the above scenario, there may be an incremental update because the system 100 previously calculated $z/(x+y-z)$ for the user pair(a,b) and the values x, y and z were previously calculated. Thus, rather than recalculating the similarity information for the activity of both users before $T_o$, the system 100 may instead calculate the incremental activity based on the activity of one or both of the users. Accordingly, for determining the similarity scores for the recommendation model, the recommendation model may be updated based on the following scenarios.

Under scenario 1, if both user a and user b are not associated with any new activity (e.g., $|UA_n(a)|=0$ or $|UA_n(b)|=0$), then there is no information to process to generate an incremental update.

Under scenario 2, if user a does not have new activity but user b has new activity, then the similarity(a,b) may be determined based on the old similarity(a,b) according to:

$x'=x$ $y'=y+|UA_n(b)|$ $z'=z+|UA_o(a)\cap UA_n(b)|$ with the new similarity(a, b)=$z'/(x'+y'-z')$, where x, y and z were previously calculated under either one of Cases 1-3 discussed above with respect to the pair (a,b). Because x, y and z were previously calculated for the pair (a,b) and stored within a database or file, the only portion that needs to be calculated is $|UA_o(a)\cap UA_n(b)|$ and $|UA_n(b)|$, which takes less computational power than calculating the entire similarity information repeatedly for each incremental update of the recommendation model.

Similarly, under scenario 3, if user b does not have new activity but user a has new activity, then the similarity(a,b) may be determined based on the old similarity(a,b) according to:

$x'=x+|UA_n(a)|$ $y'=y$ $z'=z+|UA_n(a)\cap UA_o(b)|$ with the new similarity(a, b)=$z'/(x'+y'-z')$, where x, y and z were previously calculated under either one of Cases 1-3 discussed above with respect to the pair (a,b). Because x, y and z were previously calculated for the pair (a,b), the only portion that needs to be calculated is $|UA_n(a)\cap UA_o(b)|$ and $|UA_n(a)|$, which takes less computational power than calculating the entire similarity information repeatedly for each update of the recommendation model.

Under scenario 4, user a and user b may both have new activity that was previously stored as x, y and z. Accordingly, the new similarity(a,b) may be determined based on the old similarity(a,b) according to:

$x'=x+|UA_n(a)|$ $y'=y+|UA_n(b)|$ $z'=z+|UA_o(a)\cap UA_n(b)|+|UA_n(a)\cap (UA_o(b)|+UA_n(a)\cap (UA_n(b)|$ with the new similarity (a, b)=$z'/(x'+y'-z')$, where x, y and z were previously calculated under either one or Cases 1-3 discussed above with respect to the pair (a,b). Accordingly, the recommendation model only needs to calculate $|UA_n(a)|$, $|UA_n(b)|$, $|UA_o(a)\cap UA_n(b)|$, $UA_n(a)\cap (UA_o(b)|$ and $|UA_n(a)\cap (UA_n(b)|$ to determine the new similarity scores for determining one or more recommendations. Accordingly, under scenario 4 of Case 4, the system 100 can update the old similarity scores associated with pair(a,b) (e.g., $z/(x+y-z)$) based on the new activity of both user a and user b, such that the new update takes into account not only the new activity of user a, but also the new activity of user b. Accordingly, the recommendation model may determine recommendations based on the activity of user a and b of the user pairs and can perform the calculation quickly and efficiently by only computing the new activity information rather than re-computing all of the activity information.

The system 100 also allows for updating the recommendation model based on an offline mode and an online mode. According to an offline mode, the recommendation model is updated based on a schedule of a predetermined update frequency such that the update time $T_n$ occurs at $\Delta T$ intervals from $T_o$ such that $T_n=T_o+\Delta T$. Thus, the update of the recommendation model in an offline mode occurs when the system time $T_n=T_o+\Delta T$, where, as discussed above, $T_o$ is the last update time of the recommendation model. In one embodiment, each user may have a different $\Delta T$ and therefore have different $T_n$ and $T_o$. In one embodiment, where a user is new to the system such that there is no $T_o$, $T_n=T_n$ where $T_r$ is the time the user first became associated with the recommendation model by, for example, registering with the recommendation model or otherwise using the recommendation model. For the offline mode, the user may specify the period of time $\Delta T$ to control the update time.

In an online mode, each user does not have a specified frequency $\Delta T$ for updates. Rather, the update of the online mode for the recommendation model is based on new activity associated with a user. Thus, the online mode updates the recommendation model according to $T_n$ equaling the time that the activity occurred. According to the two modes, the system 100 presents a unified framework that allows for switching between the offline mode and the online mode. The system 100 stores information regarding $T_o$ for each user according to an offline mode (e.g., the last time the recommendation model was updated according to the schedule) and an online mode (e.g., last time the recommendation model was updated according to new activity) and the user can switch between the various modes to determine, for example, how new activity has affected one or more recommendations.

The system 100 also presents the capability to provide a association information to a user when a recommendation, or other type of advertisement that may be presented to the user by a method other than a recommendation, is associated with another user that is connected to the user through some type of recognized connection. Based on the association information, the user may intuitively understand that the recommendation and/or advertisement, and the associated content, is reliable and/or recommended based on a trusted source, such as a friend or an expert/celebrity. The visual indication may be based on, for example, a different background, border, or object (and/or number of objects) associated with the recommendation or advertisement than normal, presenting the name of the connected user (e.g., friend, celebrity, or expert).

The system 100 allows for the determination of connected users based on specific associations between users. Where two users may have activity with the same item, the users are not necessarily connected. Rather, connected users share a connection through one or more services, one or more websites, one or more databases, one or more personal preferences (e.g., lists), one or more indications, etc. that indicate a connection between the users that indicates a certain level of trust between the users. The system 100 may then modify the presentation of an advertisement or recommendation to indicate to one user that the other, connected user acted on the information within the advertisement, such that the one user may have more trust in the recommendation and/or advertisement. Thus, the system 100 provides a mechanism for a user to follow item recommendations and/or advertisement content on the basis of connected users, such as friends, family members, experts, celebrities, etc.

As shown in FIG. 1, the system 100 comprises user equipment (UE) 101a-101n (collectively referred to as UE 101) having connectivity to an incremental platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may include one or more applications 111a-111n (collectively referred to as applications Ill) that may be executed or accessed at the UE 101. The applications 111 may include, for example, one or more social networking applications, one or more navigational applications, one or more calendar applications, one or more gaming applications, one or more entertainment applications, one or more lifestyle applications, one or more shopping applications, one or more Internet browsing applications, etc. In one embodiment, one or more of the applications 111 may allow a user accessing a UE 101 to download one or more additional applications by, for example, accessing a service that provides additional applications. The one or more of the applications 111 may provide one or more recommendations based on similarity information between a pair of users according the methods discussed herein.

The incremental platform 103 determines one or more recommendations based on an incremental update of a recommendation model and provides a presentation of an advertisement based on the one or more recommendations, or an advertisement or some other form of content, that indicates a connection between the user and one or more other users, as discussed in detail below.

The system 100 further includes a services platform 107 that includes services 109a-109n (collectively referred to as services 109). The services 109 may include any type of services, such as social networking services, advertisement provisioning services, recommendation services, application provisioning services, etc. In one embodiment, the functions of the incremental platform 103 may be embodied in one or more of the services 109 on the services platform 107.

The system 100 further includes content providers 113a-113n (collectively referred to as content providers 113). The content providers may provide content to the UE 101, the incremental platform 103 and the services platform 107. By way of example, the content provided by the content providers may include social networking content, advertisement content, applications, multimedia, websites, recommended content, etc.

By way of example, the UE 101, the incremental platform 103, the services platform 107, and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
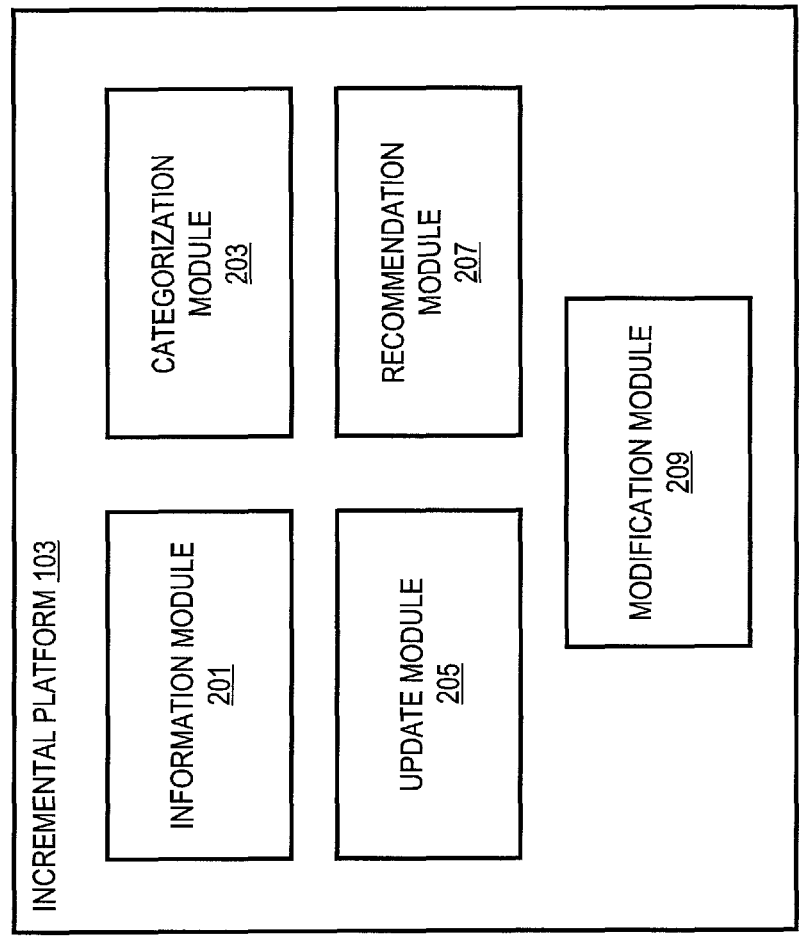
FIG. 2 is a diagram of the components of an incremental platform, according to one embodiment.

FIG. 2 is a diagram of the components of the incremental platform 103, according to one embodiment. By way of example, the incremental platform 103 includes one or more components for determining one or more recommendations based on an incremental update of a recommendation model. It is contemplated that the functions of these components may be combined in one or more components or performed by other components of equivalent functionality, such as being embodied in one or more applications 111 at the UE 101 and/or one or more services 109 within the services provider 107. In this embodiment, the incremental platform 103 includes an information module 201, a categorization module 203, an update module 205, a recommendation module 207, and a modification module 209.

The information module 201 collects information regarding the users, the items, and the activities associated with the user and the items. The users may be associated with a recommendation model that is associated with the incremental platform 103 by, for example, visiting a website, participating in a social networking service, listing to music, viewing a video, etc. that logs information regarding the user (e.g., IP address, email address, name, etc.) to identify the user. The item may be any kind of electronic content that a user may access on, for example, the UE 101, or that may be provided by one or more services 109, one or more content providers 113, etc. The activity information can be any type of information associated with the users and items (e.g., commenting, favoriting, viewing, rating, downloading, sharing, liking, dis-liking, etc.). By way of example, a user may download a media file from a website, in which case the activity may correspond to the user visiting the website, the user viewing the media file, and the user downloading the media file. Subsequent activity may correspond to, for example, the user rating the media file and sharing the media file or a link to the media file with a friend. The activity may be associated with a user, an item, or a user and an item. By way of example, a user may become friends with another user on a social networking website, which constitutes an activity of a user independent from an item. Further, an item may become associated with another item by, for example, the service provider of the items (e.g., a music service provider, etc.) linking to the two items (e.g., in case of a media file, linking the two items by genre, type, etc.). The information module 201 also determines the time the activity occurred and stores the time associated with the user and the item for later categorization of the user, the item and activity into various groups depending on the time.

The categorization module 203 accesses the information collected by the information module 201 to categorize the information into various groups according to the time associated with the activity and corresponding user and/or item. The categorization module 203 categorizes the users and/or items into at least two groups based on a time scale and at least one update time for at least one recommendation model. Upon a user associating with a recommendation model, the categorization model assigns a registration time $T_r$ to the user. Upon the incremental platform 103 updating a recommendation model associated with a user, the categorization module 203 assigns an update time $T_o$ to the user. Depending on a number of updates that are stored by the incremental platform 103, the categorization module 203 may store various update times $T_o$, $T_1$, $T_2$, $T_3$, etc. for the user. Upon the incremental platform 103 determining to update a recommendation module 203 associated with a user, the categorization module 203 assigns a current time $T_n$ to the update based on the time of the update. By way of example, for updating a recommendation model in an offline mode according to a schedule, the categorization module 203 assigns the current time $T_n$ as $T_o+\Delta T$. For updating a recommendation model in an online mode according to new activity, the categorization module 203 assigns the current time $T_n$ as the current time of the activity. In one embodiment, the categorization module 203 may store various activity times $T_{n0}$, $T_{n1}$, $T_{n2}$, $T_{n3}$, etc. to the user to remember various activity times associated with the user. Upon determining the various times associated with the activity and the update times for the users and items, the categorization module 203 categorizes the users into groups of, for example, old users $U(0, T_o)$ and new users $U(T_o, T_n)$ and old activity $UA(0, T_o)$ and new activity $UA(T_o, T_n)$. However, based on the number of stored update times, there may be more groups according to the various update times.

The update module 205 processes the activity information based on the categorization of the categorization module 203 to update the at least one recommendation model based on the activity that has occurred since the last update of the model (e.g., offline mode) or according to new activity associated with the user (e.g., online mode). Upon a determination of an update according to a scheduled update or new activity associated with a user, the update module 205 determines user pairs based on the user associated with the recommendation model and one or more other users that are also associated with the recommendation model. For the pairs of users, the update module 205 determines whether the pairs are (new, new), (new, old), (old, new), or (old, old) (e.g., cases 1-4 discussed above). For the various cases, the update module 205 determines whether there is new information associated with each user of the pair. Thus, by way of example, in an offline mode, the update module determines if the user associated with the recommendation model (e.g., user a) has recent activity from the last time the recommendation model was updated, or from the time the user first registered with the recommendation mode, and whether the other users that are paired with user a also have recent activity from the last time the recommendation model was updated. Based on this analysis, the update module 205 performs the analysis above with respect to Cases 1-4, and scenarios 1-4 for Case 4, based on the determination of new activity information. The update module 205 performs a similar analysis for an online mode but based on the determination of new activity rather than based on a scheduled time. In one embodiment, the update module 205 will perform an update of the one or more recommendation model based on a determination of new activity by switching from an offline mode to an online mode.

Accordingly, based on the two different modes, the update module 205 may determine at least two different recommendation models, such as a recommendation model that is based on activity up to a last update time for recommendations presented to a user during an offline mode, and an incremental update of the recommendation model that takes into account new activity associated with the pair of users since the last update time. The ability to switch between the offline mode and the online mode allows a user to determine how recent activity affects the recommendations provided to the user. However, upon the update time for an offline mode becoming the current time, the recommendation model will be updated with the activity associated with the pair of users since the last update time.

The recommendation module 207 determines one or more recommendations based on the recommendation models determined by the update module 205. In an offline mode, the recommendation module 207 determines the one or more recommendations based on the recommendation model that was updated based on the last update time. Accordingly, the recommendation model determines the one or more recommendations based on the information up to the last update time. In an online mode, the recommendation module 207 determines the one or more recommendations based on the recommendation model in addition to an incremental update, if applicable, that is based on activity that has occurred before and after the last update time for both users within the pair. Accordingly, the online mode allows a user to receive a more accurate recommendation that takes into account not only the recent activity of the user, but also the recent activity of other users within the user pair. However, by processing the update of the recommendation models incrementally according to the incremental update, the recommendation module (and incremental platform 103) may perform the recommendations with less computational loads because the determination is based on previous calculations updated with only the newest activity information. The recommendation module 207 may also interface with one or more applications 111, one or more user interfaces of the UE 101, or a combination thereof for presenting the one or more recommendations to a user of the UE 101.

The modification module 209 determines at least one recommendation and/or advertisement that is presented to the user. The recommendation and/or advertisement may be presented to the user based on, for example, being presented at a UE 101a associated with a user. The advertisement can be based on one or more recommendations generated by the incremental platform 103, or the advertisement may be a general advertisement that is not based on a specific recommendation. The modification module 209 further determines activity associated with the recommendation and/or advertisement associated with one or more users. The modification module 209 further determines if the one or more users that have activity associated with the modification module 209 are associated or connected to a user of the UE 101a at which the recommendation and/or advertisement is presented. The connections between the user at which the UE 101a is presented and the one or more users associated with the advertisement may be based on, for example connections through one or more social networking sites, one or more websites, one or more organizations, or a combination thereof, as discussed above. If there is a connection between the user presented the recommendation and/or advertisement and another user, the modification module 209 may modify the presentation of the content to indication association information for the recommendation and/or advertisement so that the user presented the content may follow the recommendation and/or advertisement according to the activity of the connected user. By way of example, two users may be associated through a social networking website. Accordingly, if one of the users followed the content presented in an advertisement and/or recommendation, that information may be presented to the other user so that the other user may follow the activity of the connected user. Further, by way of example, a user may be registered to a particular website that provides professional reviews of items. Thus, the user may be connected to various experts and/or reviews provided by the experts by being registered to the particular website. If the user is presented a recommendation and/or advertisement that was acted on and/or followed by one of the experts, or is associated with content that was reviewed by one of the experts, the modification module 209 may provide association information indicating such information to a user by modifying the recommendation and/or advertisement.

Figure 3:
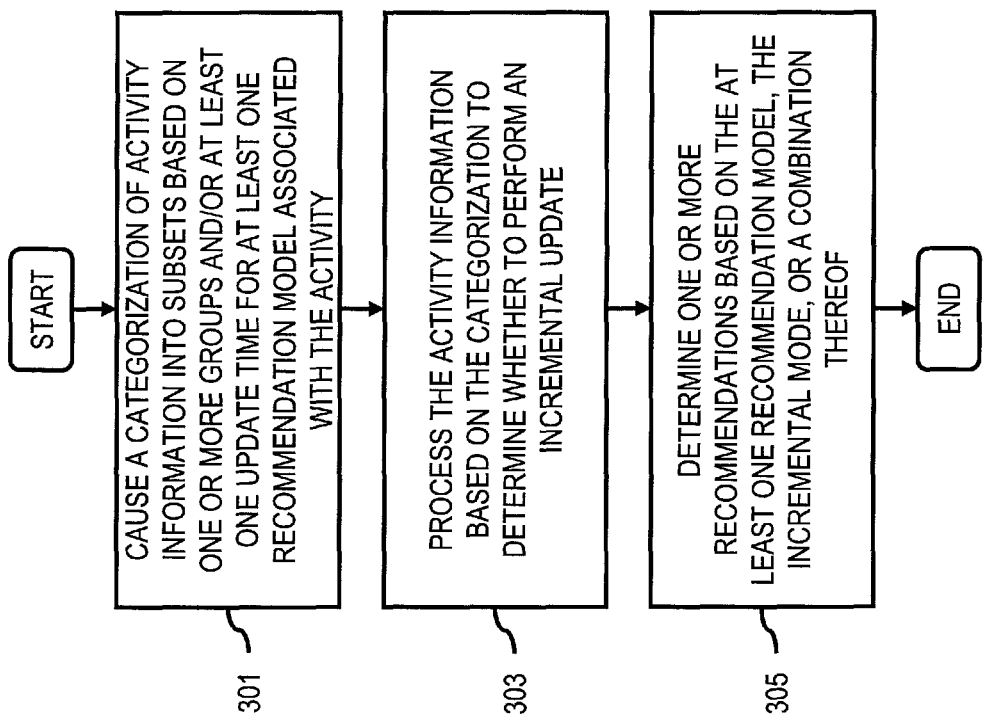
FIG. 3 is a flowchart of a process for determining one or more recommendations based on an incremental update of a recommendation model, according to one embodiment.
Figure 10:
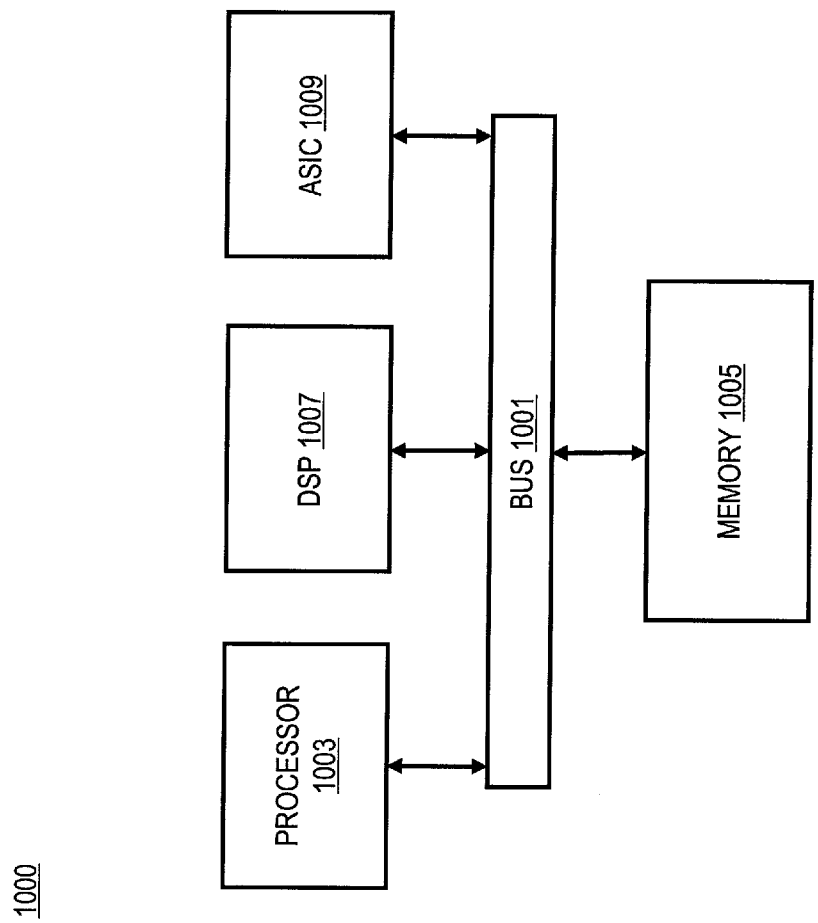
FIG. 10 is a diagram of a chip set that can be used to implement an embodiment of the invention.

FIG. 3 is a flowchart of a process for determining one or more recommendations based on an incremental update of a recommendation model, according to one embodiment. In one embodiment, the incremental platform 103 performs the process 300 and is implemented in, for instance, a chip set including a processor and a memory as shown in FIG. 10. In step 301, the incremental platform 103 causes, at least in part, a categorization of activity information into a plurality of subsets based, at least in part, on one or more user groups, one or more item groups, at least one update time for at least one recommendation model associated with the activity information, or a combination thereof. As discussed above, the one or more groups of users may be determined based on old users (users that have previously been associated with the recommendation model) and new users (users that have not previously been associated with the recommendation model). The categorization of the users into the groups may be based on users that were associated with the recommendation model before or after at least one update time associated with the at least one recommendation model. The at least one update time is a time where the incremental platform 103 updated the at least one recommendation model to base one or more recommendations on new activity that may have occurred from a previous update. The items may similarly be divided into one or more groups according to the last update time associated with the recommendation model. The activity may similarly be divided into one or more subsets based on whether the activity occurred before the at least one update time or after the at least one update time. In one embodiment, the one or more subsets of the activity information may subsequently be divided into one or more subsets according to both the at least one update time associated with the recommendation model and the one or more user groups and/or items groups. Accordingly, there may be one subset of activity information that is associated with new users that has occurred after the at least one update time, a subset of activity information that is associated with old users that occurred after the at least one update time, and a subset of activity information that is associated with old users that occurred before the at least one update time. The activity information may similarly (or alternatively) be divided into the one or more item groups based on the same approach.

In step 303, the incremental platform 103 processes the activity information based, at least in part, on the categorization to determine whether to perform an incremental update of the at least one recommendation model. As discussed above, the incremental update may be a determination of activity information associated with old users and/or items that has occurred after the at least one update of the at least one recommendation such that, rather than having to calculate the entire similarity values associated with all of the pairs of users and/or items, the incremental platform 103 may instead combine the previously calculated information based on the old activity information with the newly calculated information based on the new activity. Because only the new activity is processed for comparison of the pair of users and/or items, the amount of calculation required is significantly less than if all of the activity information were to be processed. The determination whether to perform the incremental update, therefore, may be based on, for example, whether the pair of users are both old users, whether one of the old users are associated with new activity information, and whether the other of the old users are associated with activity information.

In step 305, the incremental platform 103 determines one or more recommendations based, at least in part, on the at least one recommendation model, the incremental update, or a combination thereof. Where there is no incremental update based on the determination in step 303, the incremental platform 103 may determine the one or more recommendations based on the recommendation model that was previously determined for the pair of users (for old users) or a newly determined recommendation model that is calculated where either one of the users is a new user. Otherwise, where both users are old users such that they have a recommendation model or previously calculated information that may be used to determine one or more recommendations, and new activity information that may be processed to determine the incremental update, the one or more recommendations may be based on both the recommendation model and the incremental update. Accordingly, where a pair of users are old users and each one is associated with activity information that has occurred since a last update time associated with a recommendation model, the incremental platform 103 may determine the one or more recommendations using all of the activity information of both uses while still maintaining an efficient determination without having to re-calculate all of the similarity values that are used to generate the recommendations.

Figure 4:
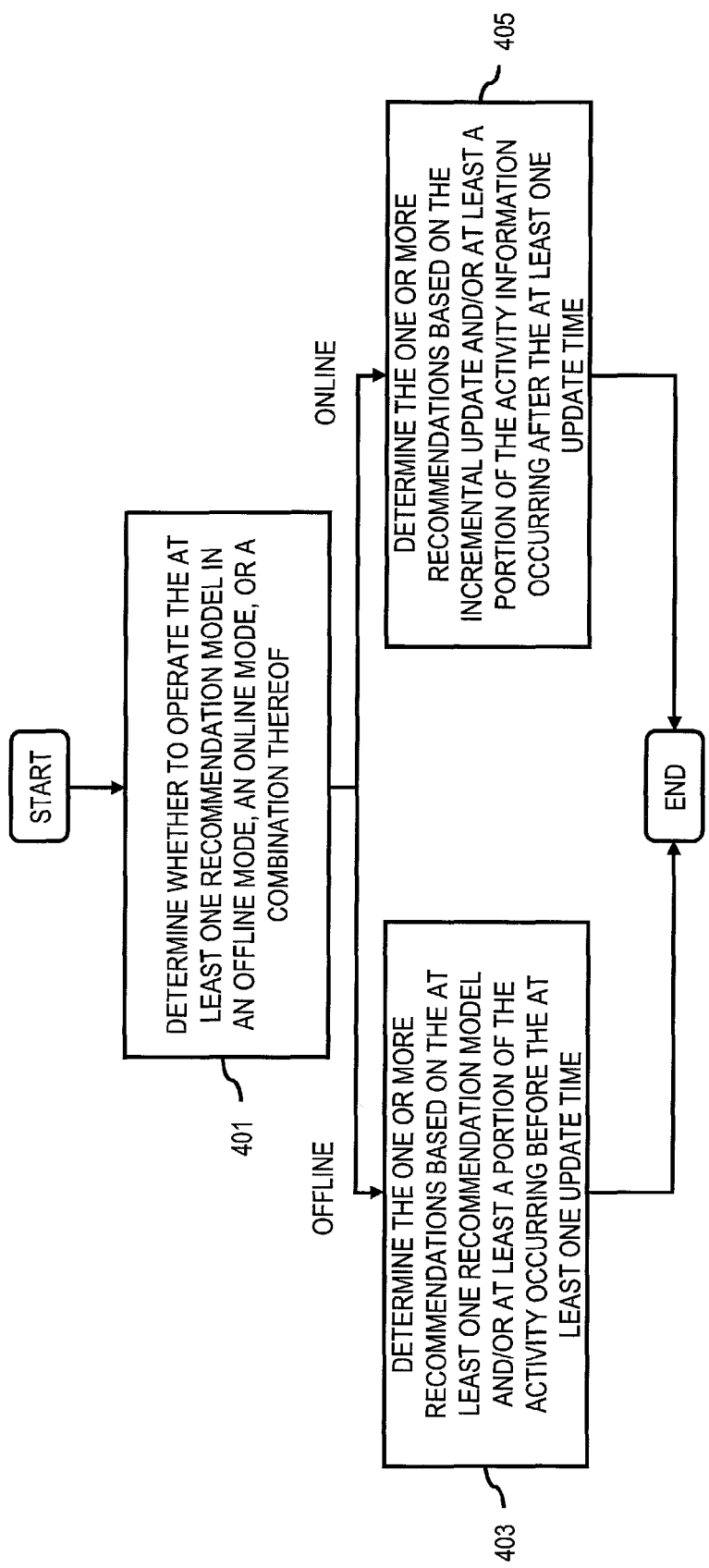
FIG. 4 is a flowchart of a process for determining one or more recommendations based on an online and/or an offline mode, according to one embodiment.

FIG. 4 is a flowchart of a process for determining one or more recommendations based on an online and/or offline mode, according to one embodiment. In one embodiment, the incremental platform 103 performs the process 400 and is implemented in, for instance, a chip set including a processor and a memory as shown in FIG. 10. As discussed above, the incremental platform 103 may be operated in an offline mode and an online mode. In step 401, the incremental platform 103 determines whether to operate the at least one recommendation model in an offline mode, an online mode, or a combination thereof. The determination may be based, at least in part, on a user input, user preferences, or a combination thereof. The user input may occur based on, for example, a user selecting an indicator that switches between the offline mode and the online mode. The user input also may occur based on, for example, the user providing one or more inputs associated with activity information. By way of example, a user may select to share an application 111a with another user. The input associated with sharing the application may also be an input that triggers the incremental platform 103 to switch from an offline mode to an online mode. The user preferences may be predetermined settings regarding the modes such that, for example, certain applications 111 and/or services 109 are associated with one mode, while other applications 111 and/or services 109 are associated with another mode.

In step 403, the incremental platform 103 determines to operate in an offline mode based on the determination in step 401. Accordingly, the incremental platform 103 may determine the one or more recommendations based, at least in part, on the at least one recommendation model, at least a portion of the activity information before the at least one update time, or a combination thereof. The offline mode updates the recommendation model based on the schedule of updates, as discussed above. Therefore, where the current time does not equal at least one update time plus the scheduled period for updates (e.g., $T_n \neq T_o + \Delta T$), the recommendation model is based on the activity prior to at least the last update time and, therefore, does not take into account any new activity information. Thus, the one or more recommendations provided in the offline mode are based on the at least one recommendation model that is not incrementally updated according to new activity information.

In step 405, the incremental platform 103 determines to operate in an online mode based on the determination in step 401. Accordingly, the incremental platform 103 may determine the one or more recommendations based, at least in part, on the incremental update, at least a portion of the activity information occurring after the at least one update, or a combination thereof. Accordingly, while in the online mode, the incremental platform 103 will determine whether there is new activity associated with at least one user. When there is new activity associated with the at least one user, that incremental platform 103 will perform an update of the at least one recommendation model based on the new activity information based on pairs of users of the at least one user and the other users associated with the recommendation model. If there are user pairs that include two old users that have a previously calculated recommendation model and at least one user includes new activity information, the incremental platform 103 will perform determine an incremental update based on the new activity information and determine the one or more recommendations based on the new activity. By performing the incremental update, the incremental platform 103 may quickly and efficiently account for the new activity for both pairs of users, if present, in a recommendation model such that new activity is used to generate the recommendations without the need, for example, for large computational resources to generate the recommendations based on all of the activity information while maintaining the accuracy by accounting for all of the activity information.

Figure 5:
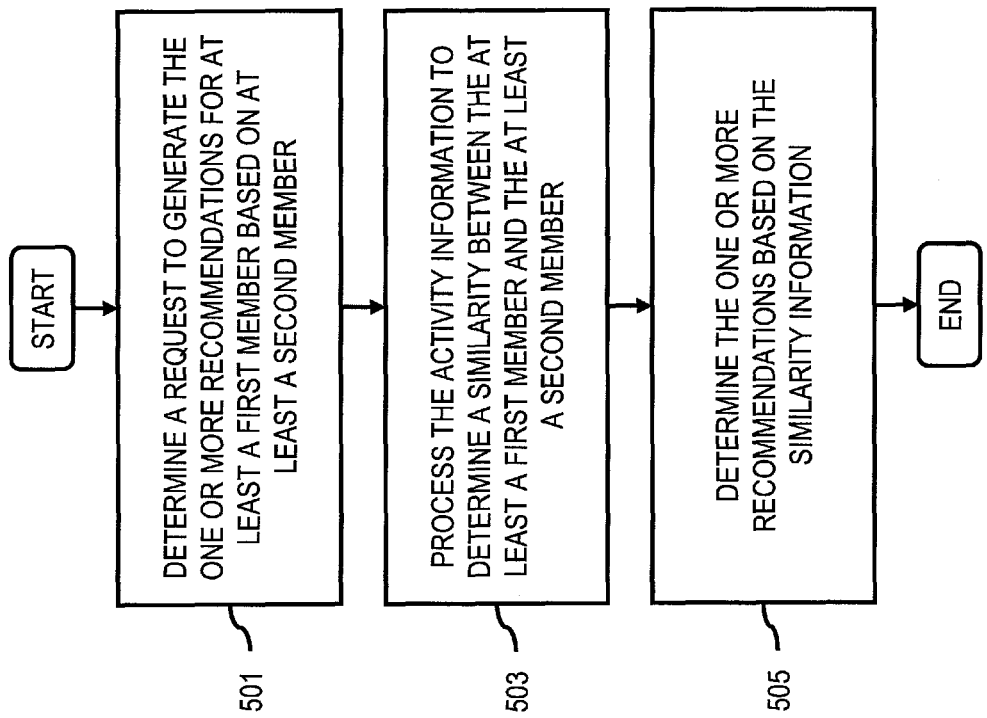
FIG. 5 is a flowchart of a process for determining similarity information between two or more users for determining one or more recommendations, according to one embodiment.

FIG. 5 is a flowchart of a process for determining similarity information between two or more users for determining one or more recommendations, according to one embodiment. In one embodiment, the incremental platform 103 performs the process 500 and is implemented in, for instance, a chip set including a processor and a memory as shown in FIG. 10. In step 501, the incremental platform 103 determines a request to generate one or more recommendations for at least a first member of the one or more user groups, one or more item groups, or a combination thereof based, at least in part, on at least a second member of the one or more user groups, the one or more item groups, or a combination thereof. As discussed above, a user may become associated with the incremental platform 103 based on, for example, navigating to a shopping website associated with a shopping service 109a. The shopping service 109a may provide the user with one or more recommendations. Upon the user visiting the shopping website, the website may interact with the incremental platform 103 to request one or more recommendations based on the user, and one or more other users (e.g., pairs of users). In one embodiment, the one or more other users may be all of the other users that are associated with the shopping website, or may be any subset of users associated with the shopping website. Thus, the incremental platform 103 determines pairs of users to determine similarities between.

In step 503, the incremental platform 103 processes the activity information to determine similarities between the at least a first member and the at least a second member (e.g., the pairs of members). The incremental platform 103 processes the activity information according to Cases 1-4 discussed above. By way of example, if the pair of members include two old users to the shopping website such that the users previously had one or more recommendations determined based on the pair, the incremental platform 103 may determine an incremental update based on any new activity associated with the users rather than determining the similarity based on the entire amount of activity information associated between the two users.

Accordingly, in step 505, the incremental platform 103 determines the one or more recommendations based, at least in part, on the similarity information. If the pair of users are associated with Cases 1-3 and Case 4, scenario 1, discussed above, there is no incremental update to the recommendation model in either an online mode or an offline mode because there is no previously calculated similarity information to incrementally update. If the pair of users are associated with Case 4, scenarios 2-4, the incremental platform 103 incrementally updates the recommendation model in either an online more or an offline mode according to the schedule based on the previously calculated similarity information. Thus, depending on the current time and the settings of the offline/online mode, the incremental platform 103 determines the one or more recommendations based on the incremental update and/or the recommendation model.

Figure 6:
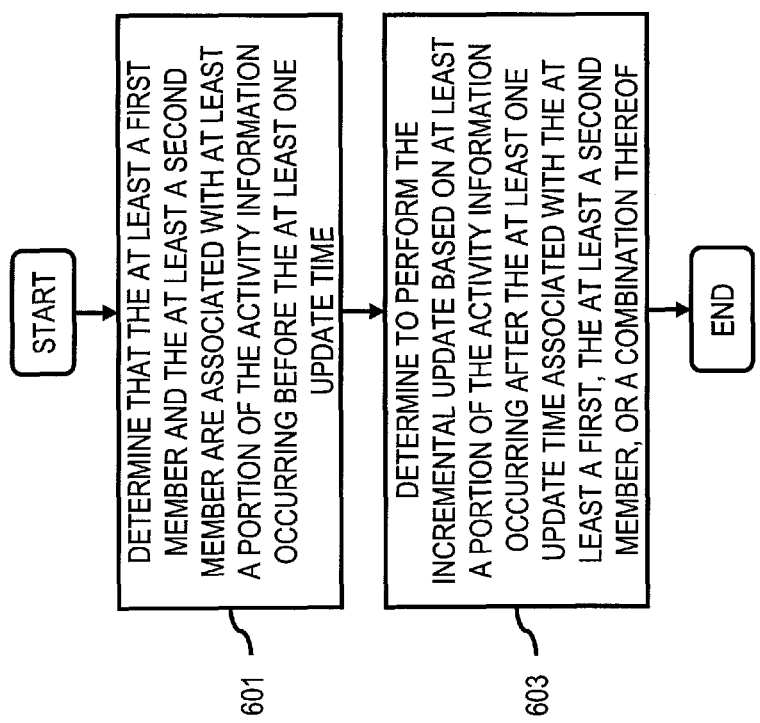
FIG. 6 is a flowchart of a process for determining to perform an incremental update based on activity information occurring after at least one update, according to one embodiment.

FIG. 6 is a flowchart of a process for determining to perform an incremental update based on activity information occurring after at least one update, according to one embodiment. In one embodiment, the incremental platform 103 performs the process 600 and is implemented in, for instance, a chip set including a processor and a memory as shown in FIG. 10. In one embodiment, as discussed above, in step 601, the incremental platform 103 determines that the at least a first member and the at least a second member are associated with at least a portion of the activity information occurring before the at least one update time. As such, the members are considered old members because they previously were associated with the incremental platform 103 and they therefore have previously calculated activity information that can be incrementally updated or used to incrementally update the recommendation model.

In step 603, the incremental platform 103 determines to perform the incremental update based, at least in part, on at least a portion of the activity information occurring after the at least one update time associated with the first member, the second member, or the combination thereof. As discussed above with respect to Case 4, where two old members subsequently are associated with new activity information, the new activity information may be used to generate an incremental update based only on the new activity information, whether only one member is associated with new activity information, or both members are associated with activity information. Accordingly, the incremental platform 103 may generate the incremental update based on the new activity information and use the incremental update to generate the one or more recommendations associated with the at least a first member by adding on the incremental update to the previously existing recommendation model, rather than having to re-calculate all of the similarity information for each user pair.

Figure 7:
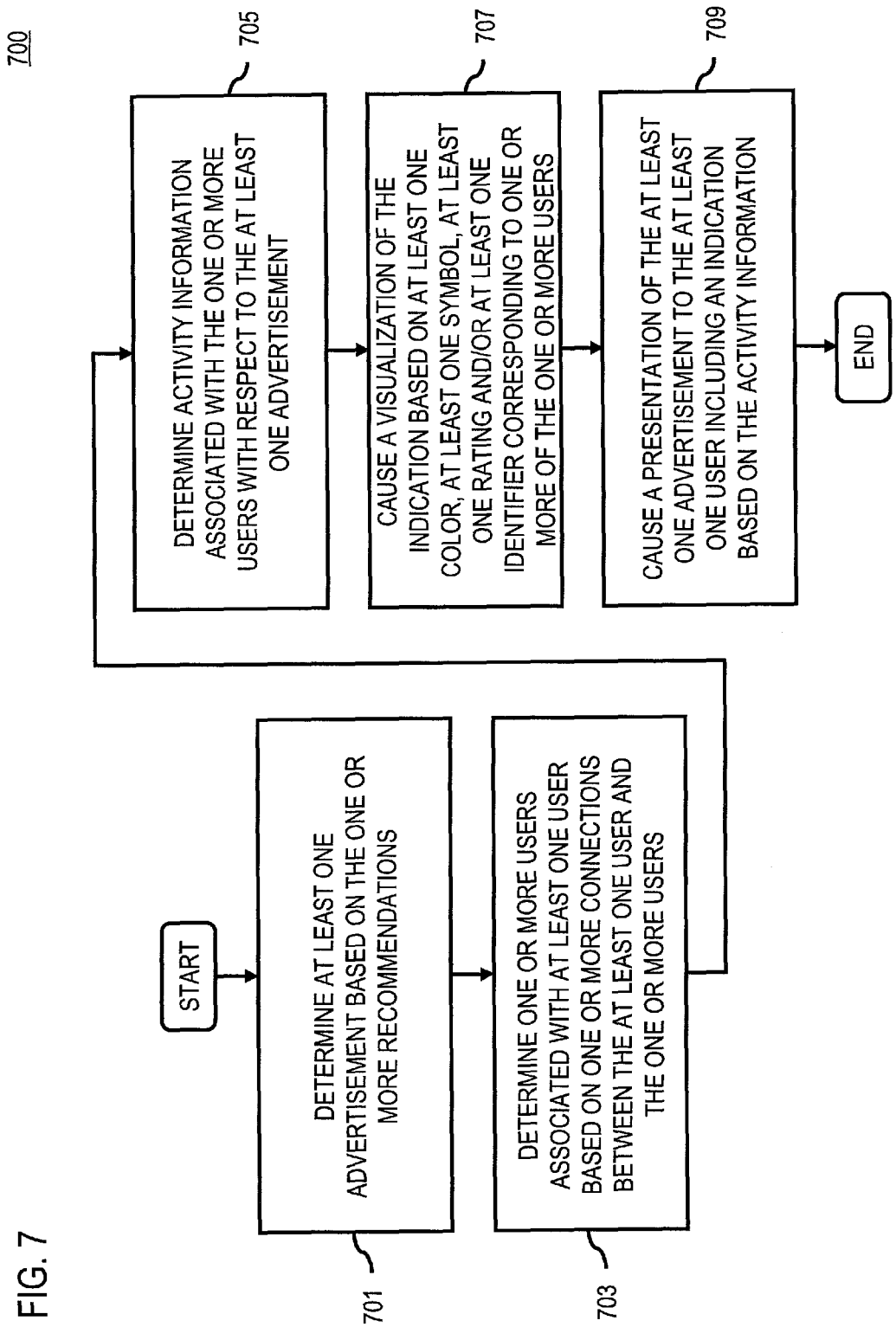
FIG. 7 is a flowchart of a process for providing one or more recommendations with association information, according to one embodiment.

FIG. 7 is a flowchart of a process for providing one or more recommendations with association information, according to one embodiment. In one embodiment, the incremental platform 103 performs the process 700 and is implemented in, for instance, a chip set including a processor and a memory as shown in FIG. 10. In step 701, the incremental platform 103 determines, in one embodiment, at least one advertisement based, at least in part, on the one or more recommendations. By way of example, the incremental platform 103 may determine a recommended advertisement based on similarity of activity information associated with a user and/or an item with another user and/or item.

In step 703, the incremental platform 103 determines one or more users associated with the at least one user based, at least in part, on one or more connections between the at least one user and the one or more users through one or more social networking sites, one or more websites, one or more organizations, or a combination thereof. As discussed above, the collected information may include connections between users through social networking websites, through various shopping and/or consumer websites, various expert websites, etc. or any type of connection that amounts to more than merely two users that like the same items or share the same activity information. By way of example, two users may be friends on the same social networking website, a user may subscribe to a goods and services websites that includes experts that provide reviews, or the user may belong to a fan group associated with a famous celebrity or athlete. According to all of the collected information, the incremental platform 103 determines the connections between the users.

In step 705, the incremental platform 103 determines activity information associated with the one or more users that are connected to a user with respect to the at least one advertisement that was determined in step 701. For example, the one or more other users may have liked an advertisement, may have purchased a product based on a recommendation or advertisement, may have reviewed and/or rated a product associated with an advertisement. Thus, the activity may be any type of activity associated with the recommendation and/or advertisement.

In step 707, the incremental platform 103 causes, at least in part, a visualization of an indication based, at least in part, on the activity information, based at least in part, on at least one color, at least one symbol, at least one rating, and/or at least one identifier corresponding to the one or more connected users to the user presented the recommendation and/or advertisement. The incremental platform 103 provides association information within the presented advertisement and/or recommendation that notifies the user who is presented the information that a connected user followed or otherwise acted on the information presented to the user. By way of example, the incremental platform 103 may modify a color associated with the advertisement to distinguish the advertisement over other advertisements that are not associated with a connected user. In one embodiment, the incremental platform 103 may modify a color associated with a rating to indicate that the rating is based on connected users rather than merely on general users. In one embodiment, the incremental platform 103 may generate an indication that identifies the connected user by name (e.g., screen name, user name, email address, given name, etc.) so that the user presented the indication can understand exactly who followed or otherwise acted on the advertisement and/or recommendation. In step 709, the incremental platform 103 causes, at least in part, a presentation of the at least one advertisement to the at least one user including the indication based, at least in part, on the activity information. Accordingly, the user is able to more accurate judge the trust of the advertisement based on the indication that indicates whether a connected user followed or otherwise promoted the advertisement.

Figure 8A:
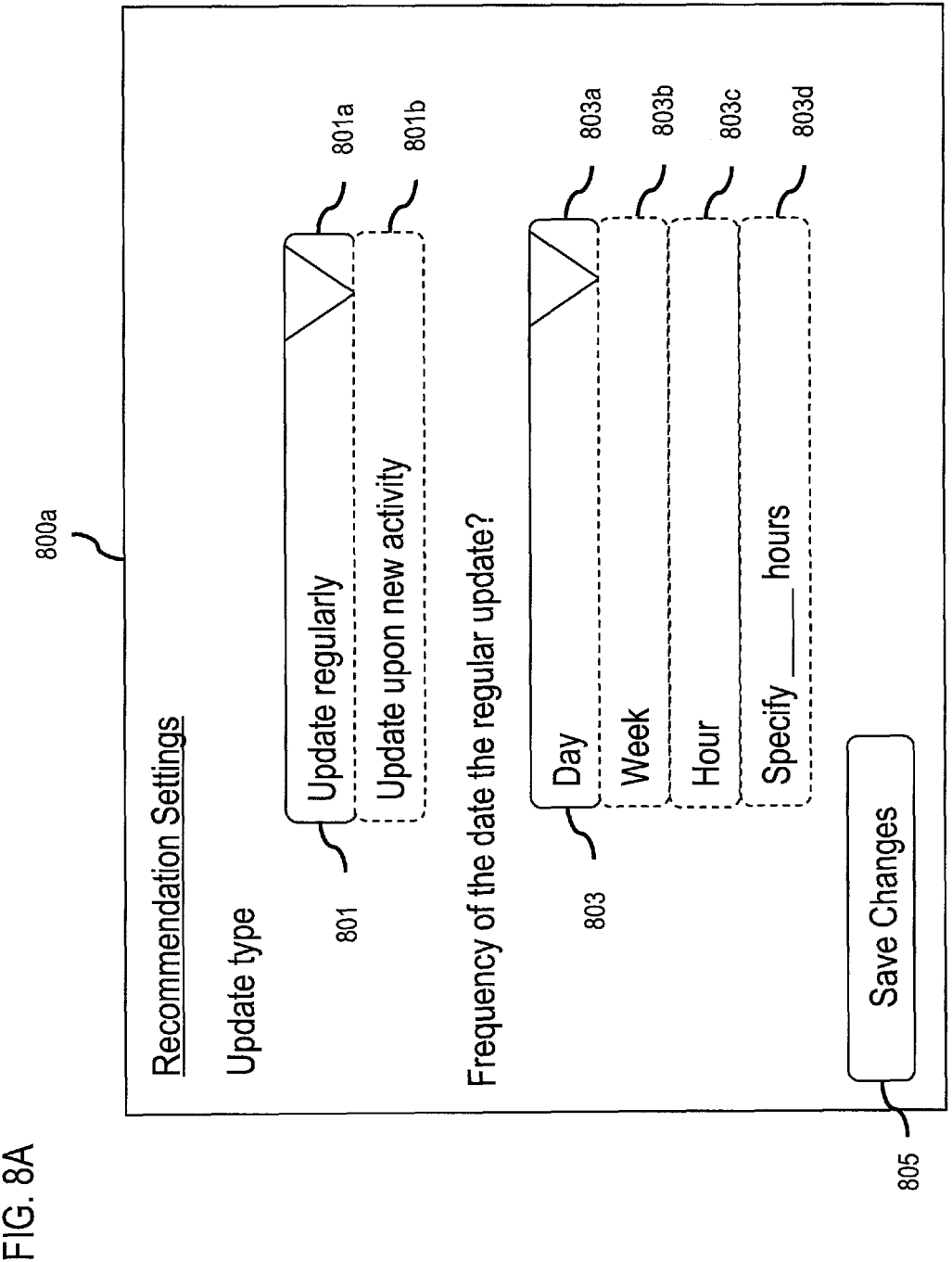
FIGS. 8A-8F are diagrams of user interfaces utilized in the processes of FIGS. 3-7, according to various embodiments.

FIGS. 8A-8F are diagrams of user interfaces utilized in the processes of FIGS. 3-7, according to various embodiments. FIG. 8A, illustrates a user interface 800a associated with configuring the recommendation settings associated with a recommendation model. The user interface 800a may include a field 801 for selecting the update type of a recommendation model. The field 801 may be any kind of field that allows a user to select the update type, such as a dropdown menu as illustrated in FIG. 8A. The field 801 may allow a user to select Update regularly entry 801a to select the offline mode, or Update upon new activity entry 801b to select the online mode. The user interface 800a may also include the field 803 that allows the user to select the frequency of updates if the user selected the offline mode. The field 803 may be any kind of field that allows a user to select the frequency, such as a dropdown menu as illustrated in FIG. 8A. The field 803 may include entries 803a-803d that allow a user to select among updating everyday (803a), every week (803b), every hour (803d), or specifying a number of hours (803d). The user interface 800a may also include an indicator 805 that allows a user to save the changes made to the recommendation settings.

Figure 8B:
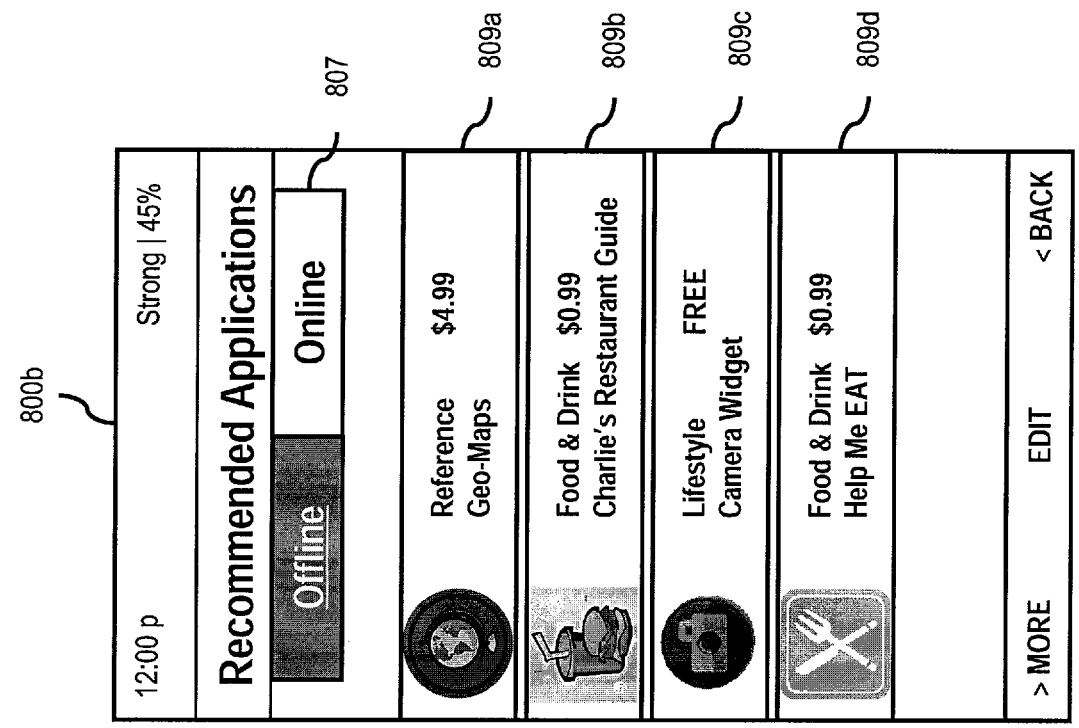

FIG. 8B illustrates a user interface 800b of an application 111a executed on a UE 101a associated with, for example, downloading applications to the UE 101a. The user interface 800b may include indicator 807 that allows a user to select between the offline mode for updating the recommendation model and the online mode for updating the recommendation model. As illustrated in FIG. 8B by indicator 807, the recommendation model is currently in an offline update mode. The user interface 800b may also include recommended applications 809a-809d that the user may select to download. In one embodiment, the order of the recommended applications may indicate the recommendation level associated with the particular applications such that the first recommended application (809a) may indicate a higher recommendation as compared to, for example, a recommended application of a lower level. By way of example, the user interface 800b may be associated with a recommendation model that was last updated at time $T_o$ based on a regular update schedule.

Figure 8C:
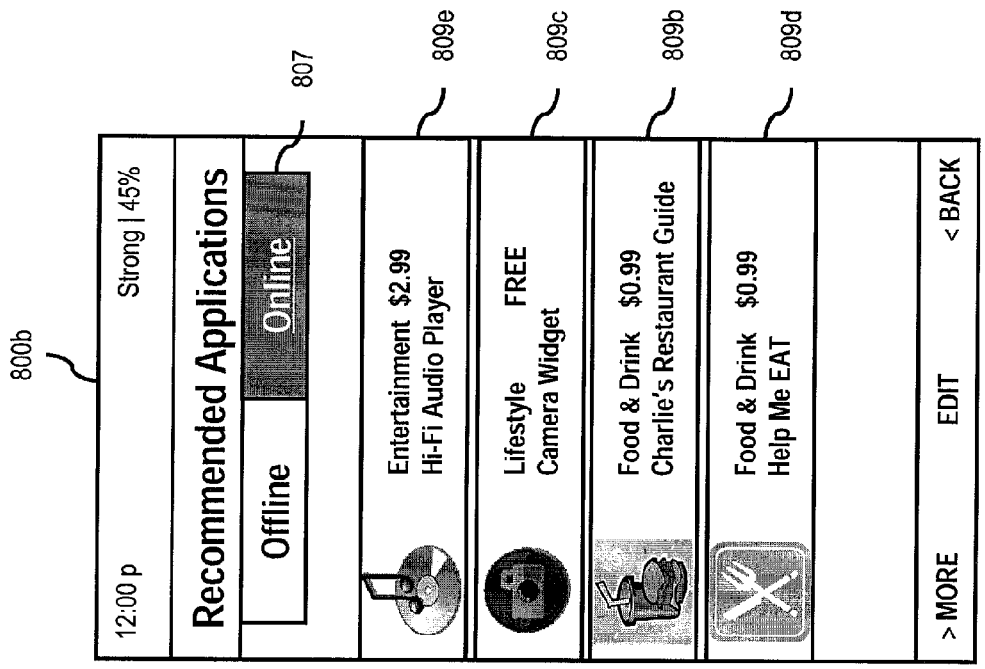

FIG. 8C illustrates the user interface 800b from FIG. 8B in an online mode, as illustrated by indicator 807. In the online mode, the recommendation model may have been updated at a point in time later than $T_o$ associated with FIG. 8B based on activity of the user associated with the UE 101a. By way of example, the user may have shared an application with another friend since the last time the recommendation model was updated. Based on the new activity, the recommendation model in the online mode may have updated the recommendations based on the new activity such that the order of the recommended entries may have changed and the entries themselves may have changed. For instance, recommended applications 809b and 809c have switched positions and recommended application 809a is no longer on the list of recommended applications. Instead, recommended application 809e is now the highest recommended application.

Figure 8D:
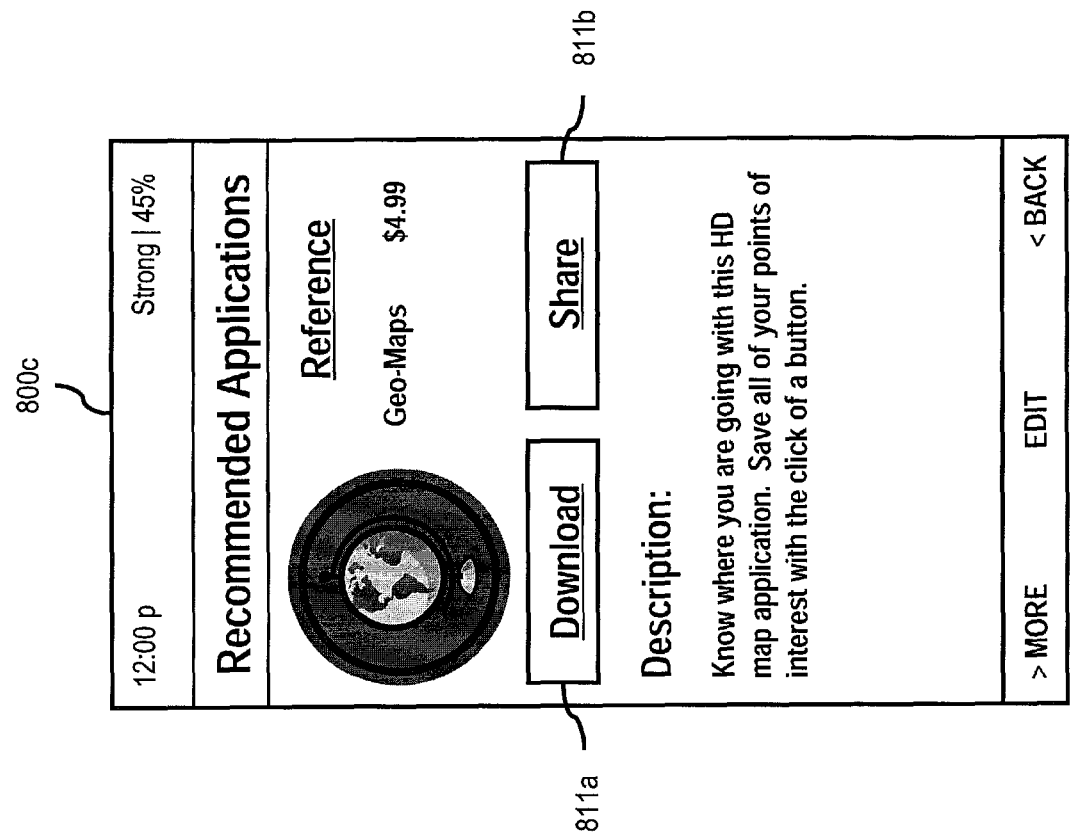

FIG. 8D illustrates the user interface 800c associated with displaying the details of a recommended application. The user interface 800c may include a download icon 811a that a user may select to download the application to the UE 101a. The user interface 800c also may include a share icon 811b that a user may select to share the recommended application with another user. A user selecting either one of the download icon 811a or the 811b icon may constitute activity that would, for example, cause the associated recommended model to update the recommendations if the recommended model is in an online mode, and used to update the recommendation model in an offline mode upon the specific scheduled time occurring that is associated with an update time.

Figure 8E:
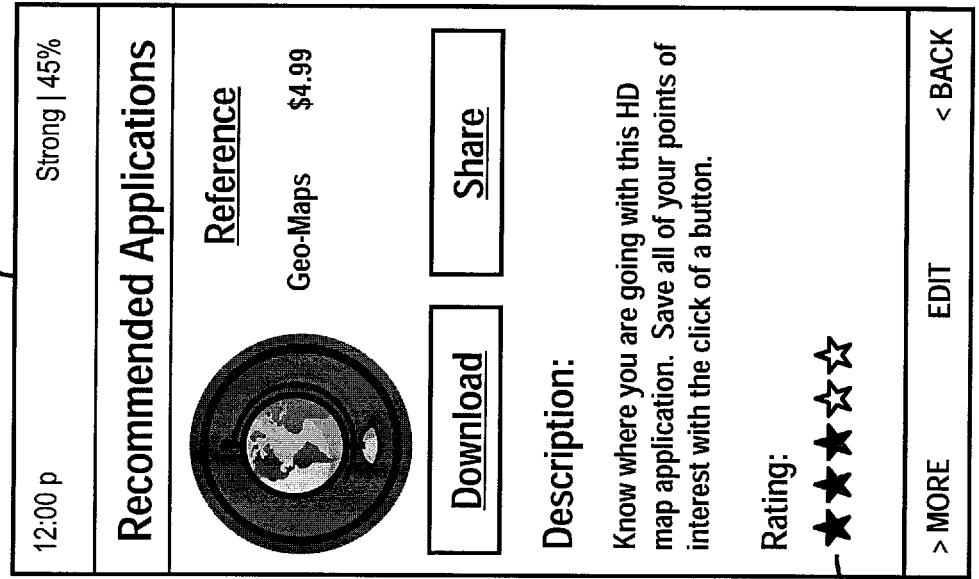
Figure 8F:
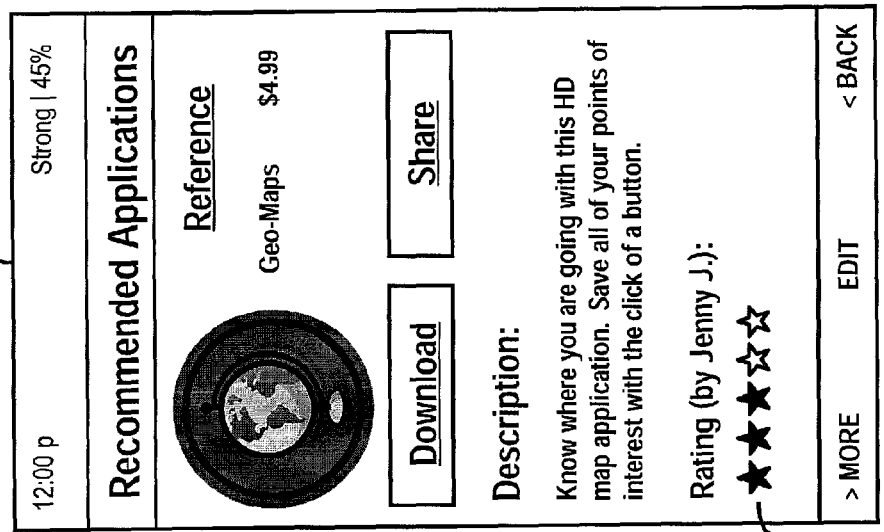

FIG. 8E illustrates a user interface 800c associated with displaying details of a recommended application that includes an association indicator 813 that indicates that another user (e.g., a connected user) performed some type of activity associated with the recommended application. By way of example, a friend of the user may have downloaded the application and rated the application. This information may be provided in the user interface 800e to provide the user associated with the UE 101a additional information specifically indicating that a friend of the user downloaded and rated the recommended application. By providing this additional information, the user associated with the UE 101a may understand that a respected friend downloaded and rated the recommended application. Such information may, for example, be more informative to the user than information associated with one or more other users that are not connected to the user rating the application. In one embodiment, to distinguish the rating of the association indicator from a rating derived from one or more other users that may not be connected to the user of the UE 101a, the association indicator 813 may be associated with a specific color or specific symbol. In one embodiment, the association indicator 813, as illustrated in FIG. 8F, may include additional information indicating the specific user that is associated with the rating. By way of example, the association indicator 813 may include the name of the other connected user who is connected to the user associated with the UE 101a.

The processes described herein for determining one or more recommendations based on an incremental update of a recommendation model may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
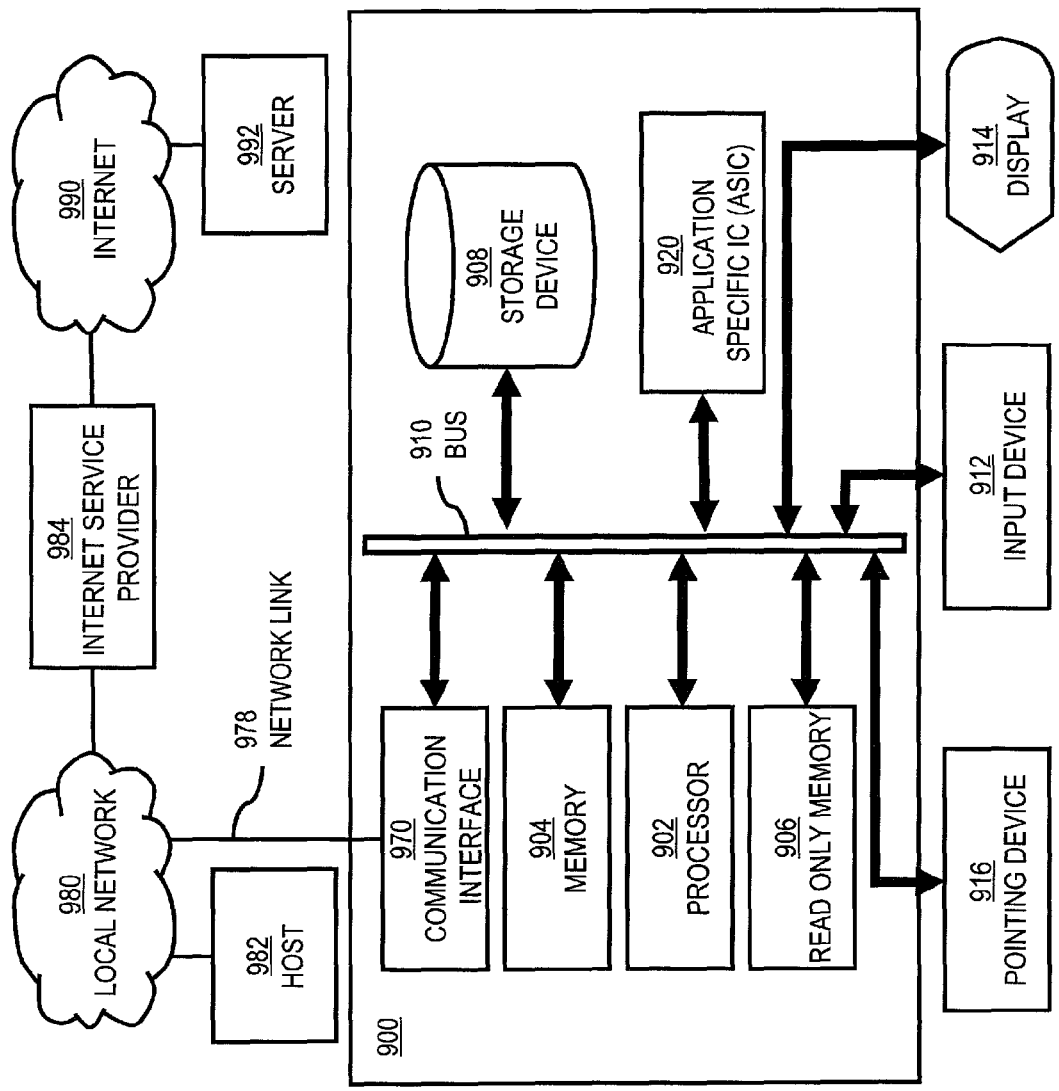
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to determine one or more recommendations based on an incremental update of a recommendation model as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of determining one or more recommendations based on an incremental update of a recommendation model.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to determining one or more recommendations based on an incremental update of a recommendation model.

The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for determining one or more recommendations based on an incremental update of a recommendation model. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for determining one or more recommendations based on an incremental update of a recommendation model, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for determining one or more recommendations based on an incremental update of a recommendation model to provide to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to determine one or more recommendations based on an incremental update of a recommendation model as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of determining one or more recommendations based on an incremental update of a recommendation model.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to determine one or more recommendations based on an incremental update of a recommendation model. The memory 1005 also stores the data associated with or generated by the execution of the inventive steps.

Figure 11:
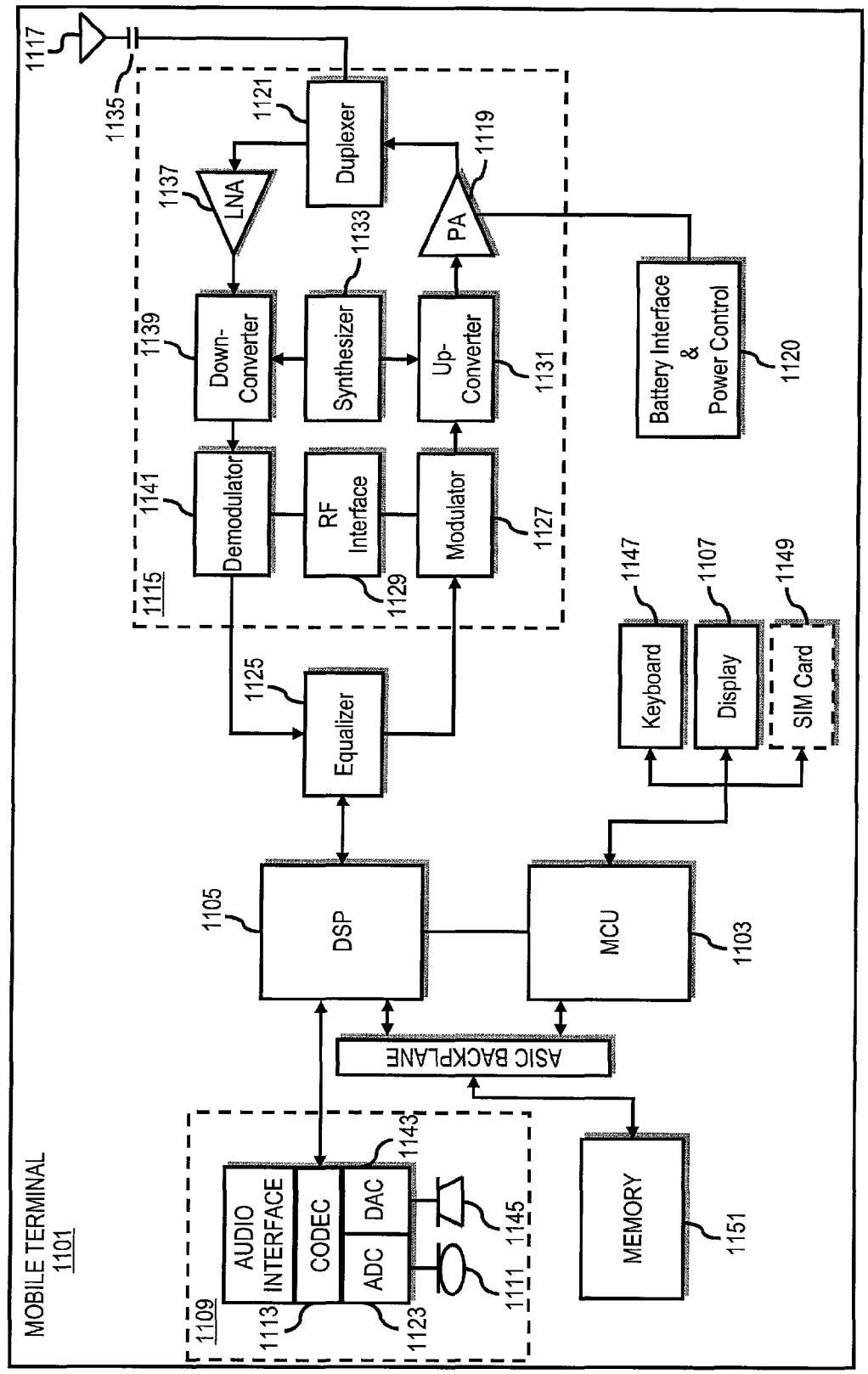
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of determining one or more recommendations based on an incremental update of a recommendation model. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of determining one or more recommendations based on an incremental update of a recommendation model. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to determine one or more recommendations based on an incremental update of a recommendation model. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method of determining one or more recommendations based on an incremental update of a recommendation model:
receiving at an incremental server information regarding users, items, and associated activities between users, items, and users and items, the information being sent over a communication network, and the incremental server comprising a processor and a memory that stores the information, wherein the processor:
categorizes activity information into a plurality of subsets based on one or more user groups, one or more item groups, at least one update time for at least one recommendation model associated with the activity information, or a combination thereof;
processes the activity information based on the categorizing to determine whether to perform an incremental update of the at least one recommendation model;
determines one or more recommendations based on the at least one recommendation model, the incremental update, or a combination thereof; and
determines to operate the at least one recommendation model in an offline mode,
wherein the offline mode determines the one or more recommendations based on the at least one recommendation model and at least a portion of the activity information occurring before the at least one update time.

2. A method of claim 1, wherein the processor further:
processes the activity information associated with the one or more user groups, the one or more items groups, or a combination thereof that has occurred after the at least one update time.

3. A method of claim 1, wherein the processor further:
determines to operate the at least one recommendation model in the offline mode and an online mode,
wherein the online mode determines the one or more recommendations based on the incremental update and at least a portion of the activity information occurring after the at least one update time.

4. A method of claim 3, wherein the processor further:
determines whether to operate in the offline mode and the online mode based on a user input, user preferences, or a combination thereof.

5. A method of claim 1, wherein the processor further:
determines a request to generate the one or more recommendations for at least a first member of the one or more user groups, the one or more user item groups, or a combination thereof based on at least a second member of the one or more user groups, the one or more user item groups, or a combination thereof;
processes the activity information to determine a similarity between the at least a first member and the at least a second member; and
determines the one or more recommendations based on the similarity information.

6. A method of claim 5, wherein the processor further:
determines to perform the incremental update based on at least a portion of the activity information occurring after the at least one update time.

7. A method of claim 6, wherein the processor further:
determines that the at least a first member and the at least a second member are associated with at least a portion of the activity information occurring before the at least one update time; and
performs the incremental update based on at least a portion of the activity information occurring after the at least one update time associated with the first member, the second member, or the combination thereof.

8. A method of claim 1, wherein the processor further:
determines at least one advertisement based on the one or more recommendations;
determines activity information associated with one or more users with respect to the at least one advertisement, wherein the one or more users are associated with at least one user; and presents the at least one advertisement to the at least one user, the at least one advertisement including an indication based on the activity information.

9. A method of claim 8, wherein the processor further:
at least one determination of determines the one or more users associated with the at least one user based on one or more connections between the at least one user and the one or more users through one or more social networking sites, one or more websites, one or more organizations, or a combination thereof.

10. A method of claim 8, wherein the processor further:
causes a visualization of the indication based on at least one color, at least one symbol, at least one rating, at least one identifier corresponding to one or more of the one or more users, or a combination thereof.

11. A non-transitory computer-readable storage medium carrying one or more sequences of one or more instructions stored thereon executed by a processor to perform a method of determining one or more recommendations based on an incremental update of a recommendation model, the method comprising:
receiving at an incremental server information, sent over a communication network, regarding users, items, and associated activities between users, items, and users and items;
storing the information in a memory of the incremental server;
categorizing activity information into a plurality of subsets based on one or more user groups, one or more item groups, at least one update time for at least one recommendation model associated with the activity information, or a combination thereof;
processing the activity information based on the categorizing to determine whether to perform an incremental update of the at least one recommendation model;
determining one or more recommendations based on the at least one recommendation model, the incremental update, or a combination thereof; and
determining to operate the at least one recommendation model in an offline mode,
wherein the offline mode determines the one or more recommendations based on the at least one recommendation model and at least a portion of the activity information occurring before the at least one update time.

12. The non-transitory computer-readable storage medium of claim 11, wherein the method further comprises:
processing of processing the activity information associated with the one or more user groups, the one or more items groups, or a combination thereof that has occurred after the at least one update time.

13. The non-transitory computer-readable storage medium of claim 11, wherein the method further comprises:
determining to operate the at least one recommendation model in the offline mode and an online mode,
wherein the online mode determines the one or more recommendations based on the incremental update and at least a portion of the activity information occurring after the at least one update time.

14. The non-transitory computer-readable storage medium of claim 13, wherein the method further comprises:
determining whether to operate in the offline mode and the online mode based on a user input, user preferences, or a combination thereof.

15. The non-transitory computer-readable storage medium of claim 11, wherein the method further comprises:
determining a request to generate the one or more recommendations for at least a first member of the one or more user groups, the one or more user item groups, or a combination thereof based on at least a second member of the one or more user groups, the one or more user item groups, or a combination thereof;
processing the activity information to determine a similarity between the at least a first member and the at least a second member; and
determining the one or more recommendations based on the similarity information.

16. The non-transitory computer-readable storage medium of claim 15, wherein the method further comprises:
determining to perform the incremental update based on at least a portion of the activity information occurring after the at least one update time.

17. The non-transitory computer-readable storage medium of claim 16, wherein the method further comprises:
determining that the at least a first member and the at least a second member are associated with at least a portion of the activity information occurring before the at least one update time; and
performing the incremental update based on at least a portion of the activity information occurring after the at least one update time associated with the first member, the second member, or the combination thereof.

18. The non-transitory computer-readable storage medium of claim 11, wherein the method further comprises:
determining at least one advertisement based on the one or more recommendations;
determining activity information associated with one or more users with respect to the at least one advertisement, wherein the one or more users are associated with at least one user; and
presenting the at least one advertisement to the at least one user, the at least one advertisement including an indication based on the activity information.

19. The non-transitory computer-readable storage medium of claim 18, wherein the method further comprises:
determining the one or more users associated with the at least one user based on one or more connections between the at least one user and the one or more users through one or more social networking sites, one or more websites, one or more organizations, or a combination thereof.

20. The non-transitory computer-readable storage medium of claim 18, wherein the method further comprises:
causing a visualization of the indication based on at least one color, at least one symbol, at least one rating, at least one identifier corresponding to one or more of the one or more users, or a combination thereof.

* * * * *